United States Patent Office 3,288,843.
Patented Nov. 29, 1966

3,288,843
PURIFICATION OF DIMETHYLTEREPHTHALATE
Lester Friedman, Beachwood, Ohio, assignor to Standard Oil Company, Chicago, Ill., a corporation of Indiana
No Drawing. Filed Apr. 11, 1962, Ser. No. 186,660
3 Claims. (Cl. 260—475)

This invention relates to a process for the purification of lower aliphatic alcohol esters of benzene carboxylic acids having from one to three carboxyl groups per molecule. More specifically, the present invention relates to a process for removing color forming impurities from esters of a lower alkanol and a benzene dicarboxylic acid. It especially concerns a process for the preparation of highly purified dimethylterephthalate and for the preparation of highly polymeric linear polyesters therefrom.

Processes for the production of linear super polyesters by the reaction of a dihydric alcohol with an aromatic dicarboxylic acid or its derivatives are well known. Especially important are the film and fiber-forming super polyesters obtained commercially as the product of the reaction of a glycol such as ethylene glycol with an ester of terephthalic acid as disclosed in U.S. Patent 2,465,319 of Whinfield and Dickson. Various other linear super polyesters have more recently become of significant commercial interest, for example, polyesters prepared by reaction of ethylene glycol with mixtures of terephthalic acid and isophthalic acid, which acids are also usually employed in the form of their dimethylesters.

In commercial development of processes for the preparation of linear polyesters of the aforementioned type, for example polyethylene terephthalate, it has been found desirable to first carry out an ester interchange reaction between the ethylene glycol and dimethylterephthalate to form bis-2-hydroxyethyl terephthalate monomer which is then polymerized to polyethylene terephthalate under reduced pressure and at elevated temperatures. These polymers preferably are free of undesirable color, requiring the use of dimethylterephthalate which is itself free of any impurities capable of producing poor polymer color. In general, it is highly desirable that the dimethylterephthalate used in the production of polyesters exhibit a color of 50 or less and preferably less than 25 on the APHA (American Public Health Association) color scale after 5–7 days in the molten state at 175° C.

Dimethylterephthalate obtained by esterification of terephthalic acid with methanol can be refined by distillation at atmospheric or reduced pressure, or by recrystallization from suitable solvents. However, distillation even at reduced pressure often results in poor yields due to heat degradation, and can lead to considerable distillate of excessively high acidity which cannot be succesfully employed in the polycondensation reaction with ethylene glycol. It has been further found that dimethylterephthalate obtained by careful fractional distillation and having satisfactory low acidity, nevertheless, contains undesirable color-producing impurities.

Although the identity of the color-producing impurities in dimethylterephthalate is not known with certainty, it is known that terephthalic acid produced by the oxidation of xylenes with nitric acid can be contaminated with nitrated and oxidized products, while terephthalic acid produced by air oxidation of xylenes can contain minor amounts of partially oxidized aromatic compounds as impurities. Although the usual methods of purification of terephthalic acid and of the dimethylterephthalate prepared therefrom will remove a major portion of the impurities, trace amounts sufficient to contribute color-producing properties to the dimethylterephthalate are difficult to remove entirely. The presence of these trace impurities can be shown by determining the color stability of dimethylterephthalate in the molten state over an extended period of time, suitably up to 7 days as will hereinafter be more fully described.

In its broadest aspects, this invention contemplates purifying lower alkanol diesters of benzene carboxylic acids having from one to three carboxyl groups per molecule, for example, the dimethyl ester of terephthalic acid by contacting such esters in the liquid state with a minor amount of a phosphite ester derived from a relatively pure high molecular weight alcohol of low volatility. The contacting is preferably carried out at elevated temperatures between about 100° C. and 300° C.; the purified carboxylic acid ester is conveniently recovered as a condensate. This invention particularly contemplates contacting molten dimethylterephthalate with a minor amount of a phosphite compound such as tristearyl phosphite or triseicosanyl phosphite and subsequently distilling the contacted dimethylterephthalate to obtain a purified and heat-stable product which is essentially free of phosphorus and thermal decomposition products from the phosphite treating agent.

This invention is to be clearly distinguished from known prior art processes in which triphenyl phosphite or other phosphorus-containing additives are employed as color stabilizers by addition thereof to the dimethylterephthalate-ethylene glycol polycondensation reaction mixture. The incorporation of such additives in the polymerization reaction mass results invariably increased reaction periods and in addition adversely affects the ultimate molecular weight of the polymer produced. It is an important feature of our invention that the purified dimethylterephthalate produced thereby be substantially free of phosphorus-containing compounds. The purified dimethylterephthalate which is obtained by the process of my invenion therefore contains substantially less than 0.05% and preferably less than 0.01% phosphorus-containing compounds.

It is known that dimethylterephthalate can be purified by contacting with a triaryl phosphite compound such as triphenyl phosphite and subsequently distilling the contacted ester to yield a purified, heat stable product which is substantially free of both color forming impurities and phosphorus-containing compounds. However, by this process a small amount of phenol resulting from the thermal decomposition of the triphenyl phosphite finds its way into the product ester.

Thus, while triaryl phosphites such as triphenyl phosphite are otherwise highly effective treating agents for removing color-forming impurities, the introduction of the phenol impurity in the purified dimethylterephthalate lessens their effectiveness as the phenol impurity interferes to some extent in the subsequent steps of the polyester process.

It has now been discovered that the beneficial effects of phosphite treating to purify dimethylterephthalate can be secured and the concomitant phenol contamination can be eliminated by treating the impure dimethylterephthalate with a minor effective amount of a phosphite ester derived from a relatively pure high molecular weight alcohol of low volatility such as stearyl alcohol or eicosanyl alcohol.

The treatment of contaminated dimethylterephthalate with the hereinbefore described high molecular weight phosphite ester not only results in a distilled product substantially free of color-forming impurities and thermal decomposition products from the treating agent but also the yield of desirable low acid number distillate is dramatically increased over that obtained in the absence of phosphite treating and is, very surprisingly, increased substantially over that obtained utilizing triaryl phosphite treating agents such as triphenyl phosphite.

It is generally recognized in the art that low acidity is an essential requirement of dimethylterephthalate which is to be employed for the preparation of linear super polyesters by reaction with dihydric alcohols. Generally, acid numbers (mg. KOH required to neutralize one gram of sample) greater than 0.05 will adversely affect the quality, especially the molecular weight, of the condensation polymer produced. I have found that the process of my invention not only gives a remarkably heat stable product, but that a substantially greater percentage of distillate can be obtained having an acid number below this critical value. In the absence of any phosphite pretreating prior to distillation, the yield of dimethylterephthalate having acceptable acid-number is only about 75% of the still charge. Using a triaryl phosphite such as triphenyl phosphite as a pretreating agent the yield is increased to about 85%. Using the phosphite treating agents of this invention yields of 90–95% are obtained. The process is of great economic value, therefore, in improving the yield of pure dimethylterephthalate which is obtainable by distillation of the crude or partially purified diester.

In a preferred embodiment of this invention, impure molten dimethylterephthalate is treated with an effective amount of a phosphite ester derived from a relatively pure high molecular weight alcohol of low volatility such as tristearyl or triseicosanyl phosphite, at a temperature below about 300° C. and subsequently distilled to obtain substantially pure dimethylterephthalate. The quantity of the treating agent required is minor but will, of course, be dependent upon the source and purity of the starting material employed. For example, when the crude ester has an acid number of up to 5.0, I have found that amounts of treating agent, as little as 0.25–0.5% by weight of the crude ester, are sufficient to yield a product ester having acceptable color stability as hereinbefore defined.

While I prefer to mix the dimethylterephthalate and the treating agent, and then to subject the mixture to a distillation step for the recovery of the desired product, I may also feed the impure dimethylterephthalate and/or the phosphite treating agent continuously to a distillation column equipped with a reboiler and a condenser. Desirably, the impure dimethylterephthalate is fed into the column at a point in the central portion thereof. Tristearyl phosphite, tris-eicosanyl phosphite or other phosphite ester as hereinbefore described having a boiling point greater than that of dimethylterephthalate is fed continuously into the column together with the DMT or alternatively at a point above the point of introduction of the impure ester. During the process, part of the material is removed continuously from the reboiler and introduced into the column admixed with the impure DMT. Substantially, pure dimethylterephthalate is taken off overhead from the condenser. A portion of the material which collects in the reboiler is withdrawn, batchwise or continuously and discarded; fresh phosphite ester is added to make up for that portion so removed.

In the practice of the present invention, molten dimethylterephthalate is admixed with a minor amount of a phosphite ester such as tristearyl or tris-eicosanyl phosphite and maintained at a temperature between about 150° C. and about 300° C., preferably between about 150° and 250° C. for a period from about ¼ hour up to about 12 hours. The pure DMT is then recovered by distillation from the mixture. Generally, the addition of from 0.01 to 10%, preferably 0.05 to 1% by weight of phosphite treating agent proves satisfactory.

The mixture of DMT and treating agent can be refluxed prior to distillation if desired at atmospheric or subatmospheric pressure. The mixture can be refluxed for from about 0.1 to about 12 hours. In general it is preferable to heat or reflux the contacting mixture for as short a time as possible consistent with obtaining the desired degree of improvement in color stability of the material being treated, for, in general, heating for unnecessarily long periods tends to nullify part of the improvement obtained by the phosphite pretreating step.

Following the contacting step, the solution is subjected to fractional distillation at atmospheric, sub-atmospheric or super atmospheric pressure to recover the dimethylterephthalate in the impurity-free, heat stable form, essentially free of any phosphorus contaminant and essentially free of thermal decomposition products of the phosphite treating agent. In the preferred practice of the invention, distillation is conducted under vacuum, for example, at pressures below about 100 mm. Hg, lower distillation temperatures resulting in product of improved color with concomitant savings in heat requirement being thereby obtained. Preferably, the initial portion of the distillate is recovered separately and discarded or recycled to the purification step, this fraction generally containing minor amounts of impurities and/or color. Preferably also, the latter portion of the distillate is discarded or recycled for further treatment.

By operating in this manner, high yields of high quality dimethylterephthalate having remarkable high temperature color stability can be obtained, and the distilled product so obtained is substantially free of any phosphorus containing compounds and substantially free of thermal decomposition products of the phosphite treating agent.

In order to more clearly illustrate the advantages of my invention, I offer the following specific examples of the practice thereof.

*Example I*

This example illustrates the purification of DMT by distillation in the absence of a phosphite treating agent.

Dimethylterephthalate, prepared by esterification of terephthalic acid which was obtained by liquid phase oxidation of p-xylene, was charged to a distillation flask fitted with a distillation column. The flask contents were refluxed at a pot temperature of 207–216° C. and a pressure of 80 mm. Hg for 4 hours until equilibrium conditions were established, and then fractions were taken overhead while maintaining the reflux ratios indicated in the table.

TABLE I
Acid number of crude DMT charge_____ 2.1
Treatment prior to distillation_____ None

| Fraction | Reflux Ratio | Wt., Percent of Charge | Acid No. |
|---|---|---|---|
| 1 | 10/1 | 6.9 | 0.27 |
| 2 | 5/1 | 6.2 | 0.18 |
| 3 | 5/1 | 6.8 | 0.08 |
| 4 | 1/1 | 11.0 | 0.05 |
| 5 | 1/1 | 10.0 | 0.027 |
| 6 | 1/1 | 20.7 | 0.019 |
| 7 | 1/1 | 21.5 | 0.017 |
| 8 | 1/1 | 9.8 | 0.029 |
| Bottoms | | 8.8 | |

A heartcut sample containing all cuts with an acid-number of 0.05 or less was composited—this included cuts 4–8. The heartcut composite had an acid-number of 0.031. The yield of heartcut material of acceptable acid-number was 72.7%.

A sample of the heartcut was placed in a tube immersed in a thermostatic bath maintained at 175±3° C. The color was measured periodically by comparison with standard APHA sample tubes. Both initially and after seven days the molten heartcut contained so much highly colored material that comparison with the APHA standards was impossible.

*Example II*

This example illustrates the same purification procedure as Example I with a preliminary purification of the crude dimethylterephthalate.

A sample of the same crude dimethylterephthalate of Example I was subjected to exactly the same heating and distillation procedure as in Example I except that the crude dimethylterephthalate was given a preliminary purification by slurrying and washing with methanol. The heartcut yield was 73.0% having an acid-number of 0.01.

A sample of the heartcut exhibited the following color stability.

TABLE II.—MOLTEN COLOR AT 175° C.—APHA

| | |
|---|---|
| Initial | 25 |
| 1 day | 50–60 |
| 2 day | 90 |
| 3 day | 100 |
| 4 day | 150 |
| 7 day | 150–200 |

After 7 days the molten sample was cloudy and contained dark colored particles.

*Example III*

This example illustrates the purification of dimethylterephthalate by treating with phosphite treating agent prior to distillation.

The same crude dimethylterephthalate of Example I (no preliminary purification) was subjected to exactly the same procedure as in Example I except that tris-eicosanyl phosphite in an amount equal to 0.5% by weight of the crude was added to the distillation flask at the start of the refluxing step. The heartcut yield of purified dimethylterephthalate was 95.0% having an acid-number of 0.012 and an initial APHA color of 10. After 4 days at 175° C. the molten color was 25 APHA and after 7 days the molten heartcut was clear and the color was 20 APHA.

*Example IV*

This example illustrates the effect of a reduced amount of phosphite treating agent.

A crude dimethylterephthalate having an acid-number of 3.5 was subjected to the refluxing and distillation procedure of Example I. Tris-eicosanyl phosphite in an amount equal to 0.25% by weight of the crude was added to the still charge. The heartcut product had an acid-number of less than 0.05 and was obtained in 91.7% yield.

The following color-stability data were obtained. For comparison the same crude dimethylterephthalate was subjected to the exact same procedure but with the omission of phosphite treating agent.

TABLE III.—MOLTEN COLOR AT 175° C.—APHA

| | DMT treated with phosphite prior to distillation | DMT distilled without phosphite pretreatment |
|---|---|---|
| Initial | 10–15 | 10–15 |
| 1 day | 15–20 | 40–50 |
| 2 day | 20 | 80–90 |
| 3 day | 25 | 80–90 |
| 7 day | 25–35 | 100–125 |

*Example V*

A sample of the crude dimethylterephthalate of Example I was subjected to the exact procedure of Example I but with the addition of 0.5% by weight of tri-stearyl phosphite to the still pot. The heartcut product had an APHA color of 50 after 5 days at 175° C.

It is apparent from the data presented in the foregoing examples that the method of this invention produces a pure, heat stable dimethylterephthalate of excellent acid-number in high yield. Furthermore, these results can be achieved without introducing undesirable impurities derived from thermal decomposition of the phosphite treating agent into the purified product. For example, the method of this invention will produce a product dimethylterephthalate having concentrations of phosphorus and other thermal decomposition products from the treating agent which are below the limit of detectability.

While the invention has been particularly illustrated by means of examples employing dimethylterephthalate, it will be clear that other esters of benzene carboxylic acids can be similarly purified. For example, diesters of terephthalic, orthophthalic or isophthalic acid with a lower alcohol having from 2 to 8 carbon atoms in the molecule, for example, diethyl, dipropyl, diisopropyl, dialkyl dibutyl, diisobutyl, dicrotyl, dioctyl, and the like can be subjected to the purification process of my invention. Similarly, the monesters of benzoic acid and the triesters of benzene tricarboxylic acids derived from these alcohols can be subjected to the purification process of my invention. My process is of particular value in the purification of dimethylterephthalate since this ester is most frequently employed for preparation of linear super polyesters.

Various phosphite esters derived from relatively pure, high molecular weight alcohols of low volatility can be employed as treating agents in the process of our invention. Tri-stearyl phosphite and tris-eicosanyl phosphite are especially valuable in the treating of dimethylterephthalate. It will be appreciated that in the treatment of high boiling esters with these treating agents, proper selection of the treating agent with a view toward separation of both the treating agent and the thermal decomposition products thereof from the purified ester is necessary. Thus, the phosphite ester and its decomposition products should have a boiling point sufficiently above that of the treated ester to enable ready separation thereof by fractional distillation.

For example, it is known that phosphite tri-esters of the type employed in this invention generally tend to produce as thermal decomposition products thereof the parent alcohol from which they are derived. Thus, triphenyl phosphite yields phenol and tri-stearyl phosphite yields stearanol. In the practice of this invention it is imperative to select a phosphite treating agent which will yield thermal decomposition products which will boil at a substantially higher temperature than the ester being purified. In this manner contamination of the product ester is avoided; the product can be simply distilled out of the contacting mixture, leaving the contaminants in the rejected bottoms fraction.

Alternatively, the treated ester after contacting with the phosphorus-containing compound, can be separated therefrom by crystallization of the mixture from an appropriate solvent, and the impurity-free diester subsequently distilled to obtain a product of desirable high purity and high temperature color stability.

In still another embodiment of my invention the ester can be contacted while in solution. For example, dimethylterephthalate can be dissolved in methanol and the phosphite treating agent can be added thereto. After the contacting step has been carried out the dimethylterephthalate can be separated from the solution by crystallization followed by filtration, centrifugation, decantation or the like. The separated dimethylterephthalate can then be distilled to yield a product having the desired high purity and high temperature color stability.

I claim:

1. The method of improving the heat stability of dimethylterephthalate which comprises:
   (a) heating molten dimethylterephthalate in the presence of from 0.05 to about 1.0 percent by weight of a treating agent selected from the group consisting of tri-stearyl phosphite and tris-eicosanyl phosphite for a period of 1.0 to 4.0 hours at sub-atmospheric pressure and at a temperature between about 150° C. and 250° C.; and
   (b) fractionally distilling dimethylterephthalate therefrom so as to obtain a distillate substantially free of phosphorus and thermal decomposition products of said treating agent and having improved high temperature color stability.

2. The method of improving the high temperature color stability of dimethylterephthalate which comprises:

(a) contacting said dimethylterephthalate in the molten state at a temperature between about 150° C. and 250° C. with from 0.01 to about 10 percent by weight of tri-stearyl phosphite and;

(b) fractionally distilling said contacted dimethylterephthalate from the contacting mixture so as to obtain a distillate substantially free of phosphorus and thermal decomposition products of tri-stearyl phosphite and having improved high temperature color stability.

3. The method of improving the high temperature color stability of dimethylterephthalate which comprises:

(a) contacting said dimethylterephthalate in the molten state at a temperature between about 150° C. and 250° C. with from 0.01 to about 10 percent by weight of tris-eicosanyl phosphite and;

(b) fractionally distilling said contacted dimethylterephthalate from the contacting mixture so as to obtain a distillate substantially free of phosphorus and thermal decomposition products of tris-eicosanyl phosphite and having improved high temperature color stability.

References Cited by the Examiner
UNITED STATES PATENTS
2,612,515  9/1952  Hudson et al. _____ 260—475

LORRAINE A. WEINBERGER, *Primary Examiner.*

DUVAL T. McCUTCHEN, *Examiner.*

A. D. ROLLINS, T. L. GALLOWAY,
*Assistant Examiners.*